United States Patent
Gauselmann (10) Patent No.: US 7,458,889 B2
(45) Date of Patent: Dec. 2, 2008

(54) BONUS ROUND FOR MULTIPLE GAMING MACHINES WHERE AWARD IS MULTIPLIED BASED ON CERTAIN VARIABLES

(75) Inventor: Michael Gauselmann, Espelkamp (DE)

(73) Assignee: Atronic International GmbH, Lübbecke (DE)

( * ) Notice: Subject to any disclaimer, the term of this patent is extended or adjusted under 35 U.S.C. 154(b) by 862 days.

(21) Appl. No.: 10/829,043

(22) Filed: Apr. 21, 2004

(65) Prior Publication Data

US 2004/0235552 A1  Nov. 25, 2004

Related U.S. Application Data

(63) Continuation-in-part of application No. 10/658,562, filed on Sep. 8, 2003, which is a continuation-in-part of application No. 10/464,109, filed on Jun. 17, 2003, which is a continuation-in-part of application No. 10/277,525, filed on Oct. 21, 2002.

(51) Int. Cl.
*A63F 9/00* (2006.01)

(52) U.S. Cl. .......................................... 463/16; 463/20

(58) Field of Classification Search .................. 463/16, 463/20
See application file for complete search history.

(56) References Cited

U.S. PATENT DOCUMENTS

| | | | | |
|---|---|---|---|---|
| 5,046,736 | A * | 9/1991 | Bridgeman et al. ........... | 463/13 |
| 5,664,998 | A * | 9/1997 | Seelig et al. ................. | 463/20 |
| 5,697,843 | A | 12/1997 | Manship et al. | |
| 6,206,782 | B1 * | 3/2001 | Walker et al. ................. | 463/25 |
| 6,217,448 | B1 * | 4/2001 | Olsen .......................... | 463/25 |
| 6,406,369 | B1 * | 6/2002 | Baerlocher et al. ............ | 463/20 |
| 6,537,152 | B2 * | 3/2003 | Seelig et al. ................. | 463/30 |
| 6,960,134 | B2 * | 11/2005 | Hartl et al. ..................... | 463/20 |
| 7,004,836 | B2 * | 2/2006 | Kaminkow et al. ........... | 463/20 |

(Continued)

OTHER PUBLICATIONS

Fey, Marshall. "Slot Machines: a pictorial history of the first 100 years". Reno, Nev.: Liberty Belle Books. 5$^{th}$ ed. pp. 96, 163, and 169.*

*Primary Examiner*—Xuan M. Thai
*Assistant Examiner*—Seng Heng Lim
(74) *Attorney, Agent, or Firm*—Patent Law Group LLP; Brian D. Ogonowsky (57) ABSTRACT

A system of linked gaming machines is disclosed herein. Upon a certain triggering event occurring, eligible gaming machines simultaneously receive a signal for initiating a free game bonus round. The players that have been playing the gaming machines will then play a certain number of free games in a competition with other players involved in the same bonus round. The player awarded the most credits or points from the play of the free games is awarded a special jackpot. Other jackpot games (e.g., split jackpot) are also envisioned. In another embodiment, a jackpot award or any award to the players may be granted based on the outcomes of the free games. In one embodiment, the base awards to the player(s) for the bonus round are multiplied by a multiplier that may be based on the number of players, based on the players' rankings, based on other outcomes of the bonus round, or a fixed or random multiplier. The possibility of the free game bonus round occurring at any time provides incentive for players to keep playing the linked gaming machines. The free game bonus round may also be played on a single non-linked machine where bonuses may be granted for credits exceeding certain levels.

8 Claims, 5 Drawing Sheets

U.S. PATENT DOCUMENTS

| | | | |
|---|---|---|---|
| 7,169,051 B1 * | 1/2007 | Mossbarger | 463/42 |
| 2002/0039923 A1 * | 4/2002 | Cannon et al. | 463/42 |
| 2002/0082071 A1 * | 6/2002 | Riendeau et al. | 463/16 |
| 2002/0155884 A1 * | 10/2002 | Updike | 463/25 |
| 2002/0193162 A1 * | 12/2002 | Walker et al. | 463/42 |
| 2003/0040357 A1 * | 2/2003 | Baerlocher | 463/20 |
| 2003/0060265 A1 * | 3/2003 | Webb | 463/20 |
| 2003/0092490 A1 | 5/2003 | Gauselmann | |
| 2003/0181238 A1 * | 9/2003 | DeMar et al. | 463/20 |
| 2003/0195027 A1 * | 10/2003 | Baerlocher et al. | 463/16 |
| 2003/0207707 A1 * | 11/2003 | Slomiany et al. | 463/16 |
| 2003/0216165 A1 * | 11/2003 | Singer et al. | 463/20 |
| 2004/0053666 A1 * | 3/2004 | Vancura | 463/16 |
| 2004/0106446 A1 * | 6/2004 | Cannon et al. | 463/16 |
| 2004/0147306 A1 * | 7/2004 | Randall et al. | 463/20 |
| 2004/0185931 A1 * | 9/2004 | Lowell et al. | 463/17 |
| 2004/0242316 A1 * | 12/2004 | Oles et al. | 463/20 |
| 2004/0248641 A1 * | 12/2004 | Jarvis et al. | 463/20 |
| 2005/0003878 A1 * | 1/2005 | Updike | 463/16 |
| 2006/0063584 A1 * | 3/2006 | Brill et al. | 463/20 |
| 2006/0105827 A1 * | 5/2006 | Metzger et al. | 463/9 |

\* cited by examiner

BONUS ROUND FOR MULTIPLE GAMING MACHINES WHERE AWARD IS MULTIPLIED BASED ON CERTAIN VARIABLES

CROSS REFERENCE TO RELATED APPLICATIONS

This invention is a continuation-in-part of U.S. application Ser. No. 10/658,562, entitled Free Game Bonus Round for Gaming Machines, filed on Sep. 8, 2003, which is a continuation-in-part of U.S. application Ser. No. 10/464,109, entitled Free Game Bonus Round for Gaming Machines, filed on Jun. 17, 2003, which is a continuation-in-part of U.S. application Ser. No. 10/277,525, entitled Device to Automatically Change Award Parameters for a Gaming Machine, filed on 21 Oct. 2002. These applications are incorporated herein in their entirety by reference.

FIELD OF THE INVENTION

This invention is related to gaming devices and, in particular, to a method of conducting a bonus round in linked gaming machines.

BACKGROUND

Modern gaming machines, such as video slot machines and motor-driven reel type slot machines, are largely electronic. Such gaming machines communicate via wires to a common computer for accounting and other purposes. Such linked gaming machines may also be commonly controlled by a central controller for enhanced play. The enhanced play may be the multiplication of the standard awards for a specified period of time, such as described in U.S. Pat. No. 6,217,448, incorporated herein by reference.

It is always desirable to develop new games and features to attract players to the gaming machines and to keep the players playing those gaming machines.

SUMMARY

A system of linked gaming machines is disclosed herein. Upon a certain triggering event occurring, eligible gaming machines simultaneously receive a signal for initiating a free game bonus round. The players that have been playing the gaming machines will then play, for example, ten free games in a competition with other players involved in the same bonus round. The player awarded the most credits or points from the play of the free games is awarded a special jackpot. In other embodiment, multiple players win awards from the bonus round.

After the bonus round, any credits won during the free game bonus round are added to the players' regular credits, so the player can then cash out or use such credits for playing regular games.

The possibility of the free game bonus round occurring at any time provides incentive for players to keep playing the linked gaming machines.

In one embodiment, the base awards to the player(s) for the bonus round are multiplied by a multiplier that may be based on the number of players, based on the players' rankings, based on other outcomes of the bonus round, or a fixed or random multiplier.

Other features are described, such as the dynamic allocation of money from the players' wagers to various jackpots and other pots used in the free game bonus round. In one embodiment, a free game pot (FGP), used to fund the "virtual" wagers during the free game round, is quickly filled to an adequate level by allocating a high percentage of the wagers to the FGP. Then, after the FGP is full, the percentages of the wagers allocated to the other pots, such as one or more jackpots, are increased. In this way, each free game bonus round is fully funded prior to the bonus round being triggered.

Other features are also described.

DETAILED DESCRIPTION

Figure 1:
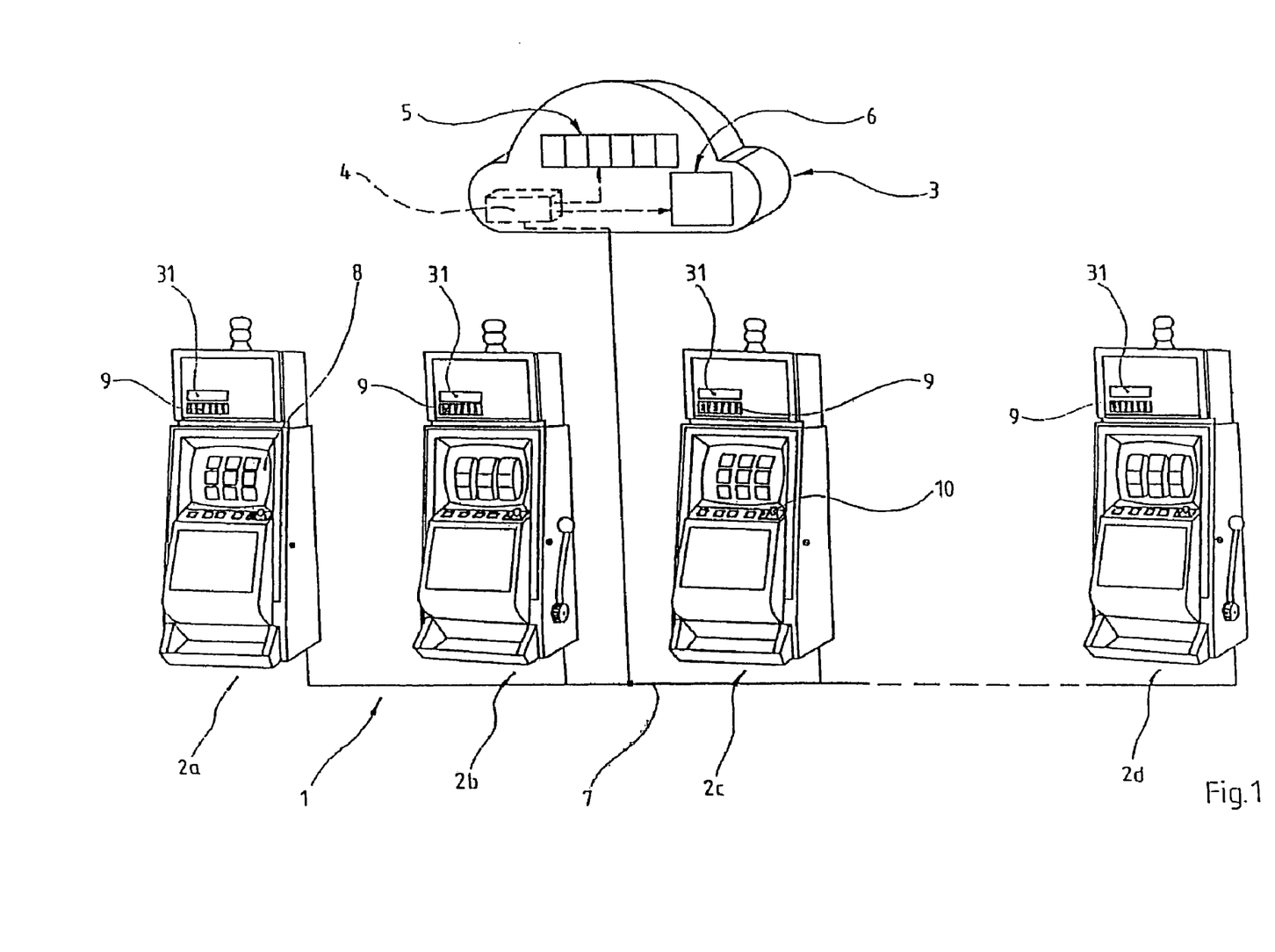
FIG. 1 shows a plurality of gaming machines commonly connected to a jackpot controller, which may be a separate controller or a controller in one of the gaming machines operating as a master.

A system of linked gaming machines 1, illustrated in FIG. 1, comprises a plurality of gaming machines 2a-2d. In one embodiment, gaming machines 2a-2d are connected to a jackpot display enclosure 3 that houses a publicly viewable jackpot display 5 and a display 6 to indicate the activation of the free game bonus round.

In one embodiment, a jackpot controller 4 (a processor) controls various aspects of the bonus round feature, such as allocating percentages of the wagers to one or more pots, controlling the displays in the jackpot display enclosure 3, and determining when the free game bonus round is triggered. In other embodiments, the processing for the free game bonus round is performed by one of the gaming machines 2a-2d acting as a master.

Gaming machines 2a-2d are linked within a communication network by wires 7 or by a wireless connection. The gaming machines 2a-2d may be video types that display conventional games on a display screen 8 or may be motor-driven reel types where awards are based on combinations of symbols across one or more pay lines. Video gaming machines may also simulate the rotation of reels or conduct any other game, including card games, roulette, or any other known game.

Each gaming machine 2a-2d may have its own display 9 that can display any pertinent information, such as credits, the jackpot amount for a free game bonus round, or the activation of the free game bonus round.

On the front of each gaming machine 2a-2d, there is a money acceptor 10 for accepting bills, coins, player account cards, prepaid cards, paper tickets with bar codes, or any other type of means for playing the gaming machine.

Figure 2:
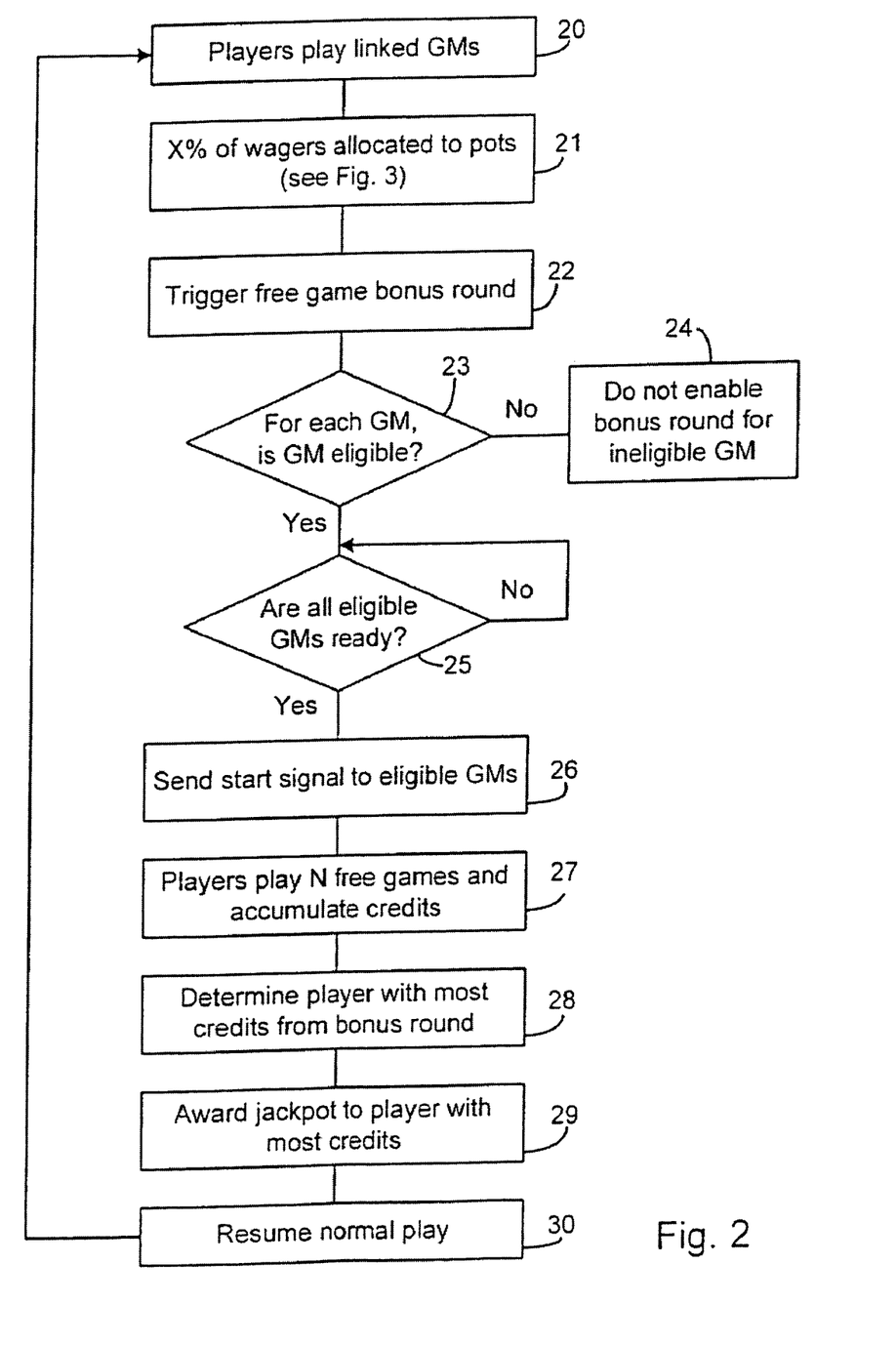
FIG. 2 is a flowchart of certain steps performed prior to, during, and after the free game bonus round.

FIG. 2 is a flow chart illustrating one process for conducting a free game bonus round.

In step 20, players play the linked gaming machines (GM) in a normal manner. Such games played may include obtaining winning combinations of symbols on actual or video reels across one or more pay lines or any other type of game, including card games.

In step 21, percentages of the wagers from the players playing the linked gaming machines are allocated to one or more jackpots and one or more pots related to the free game bonus round. In one embodiment, there are five pots that are filled with different percentages of the wagers, where the percentages are dynamically allocated based on whether the various pots have reached a certain level. Such an embodiment will be described later with respect to FIG. 3. For simplicity in FIG. 2, it will be assumed that only one jackpot is being filled by a percentage of the wagers in step 21.

In step 22, an event triggers a free game bonus round for eligible gaming machines. Such a triggering event may include the jackpot reaching a certain level, one of the players obtaining a special winning combination of symbols or other outcome, a random time event, or any other suitable event.

In one embodiment, a random number generator generates a number within a certain range, and when the jackpot has reached that randomly selected number, the free game bonus round is initiated for eligible gaming machines. In other words, as long as the jackpot is within a range between a lower range and an upper range, the free game bonus round for that jackpot may be randomly initiated.

In one embodiment, the triggering of the free game bonus round by a controller, such as controller 4 in FIG. 1, causes a signal to be transmitted to one of the linked gaming machines to display a special winning symbol combination so that the player of that gaming machine believes that she is the cause of the free game bonus round being initiated. Alternatively, the free game bonus round may be randomly initiated by any gaming machine independently obtaining a special symbol combination once the pots are at a specified minimum level.

The activation of the free game bonus round may be displayed on display 6 in the jackpot enclosure 3 to add excitement and to gain the attention of potential players.

In step 23, for each gaming machine in the system, it is determined whether the gaming machine is eligible for the free game bonus round. Gaming machines that are not being actively played are not eligible. In one embodiment, to be eligible, a gaming machine must have been played within a period of time, such as three seconds. Each gaming machine may have a red light emitting diode (LED) and a green LED, where illumination of the green LED indicates that the gaming machine is eligible for the free game bonus round. The green LED remains lit as long as the player keeps the gaming machine sufficiently active. Alternatively, or in addition, a gaming machine may be eligible if there are credits remaining in the machine. The red and green LEDs may be substituted by an indication of eligibility on the main display screen or in a different manner.

If a gaming machine is not eligible then, in step 24, the gaming machine is not enabled for the free game bonus round.

In step 25, it is determined whether the eligible gaming machines are ready to play the free game bonus round. All current games must first be completed before a free game bonus round starts.

In step 26, once all regular games have been completed, a controller, such as controller 4 in FIG. 1 or a master gaming machine, sends a start signal to all the eligible gaming machines simultaneously. The start signal controls each of the eligible gaming machines to play N free games. In one embodiment, each eligible gaming machine is enabled for ten free games.

A special animation on the gaming machines' display screens may explain the free game bonus round and add excitement to the bonus round competitions.

In step 27, the players play the N free games by pressing the spin reels button or playing any other game in the conventional manner. During the N free games, credits are accumulated based upon the results of the free games. The credits won during the free game bonus round may be displayed on a special meter (e.g., display 9 in FIG. 1) that has been reset to zero at the start of the bonus round. If the machine is a video type machine, the credits may be displayed on the video screen.

The number of credits awarded for any wins during the free games is based upon the last bet made by the player in the conventional play mode in step 20. This encourages players to play maximum bets during the conventional play mode so that this maximum bet will be applied to all free games during the free game bonus round.

Instead of credits being awarded in the bonus round, points can be awarded and the jackpot granted to the player with the most points. In all embodiments described herein, points may be substituted for credits. The points or credits are referred to herein as winning units.

A player may be notified on a display screen whether the player is in the number one, number two, number three, etc. position during the ongoing free game bonus round.

In step 28, after all games have been played in the free game bonus round, a controller, such as controller 4 in FIG. 1 or one of the gaming machines, determines which player has won the most credits during the bonus round.

In step 29, the player that won the most credits (or winning units) during the free game bonus round wins the jackpot prize. The gaming machine may pay off the player in credits or coins, or signals for an attendant to pay the player if insufficient coins are in the machine.

In another embodiment, instead of a competition, the jackpot is split between all the participating machines at the end of the bonus round.

The credits won by each player during the bonus round are then transferred to the main credit meter (e.g., meter 31 in FIG. 1) so that the player can then either cash out or play those credits in subsequent games.

In step 30, normal play resumes.

The process of FIG. 2 is a game neutral concept in that it may be applied on top of any type of game played on linked gaming machines. Accordingly, any modern electronic gaming machine may be augmented to play the free game bonus round. Simple control signals applied by a controller can control the electronic gaming machines to play any number of free games.

Figure 3:
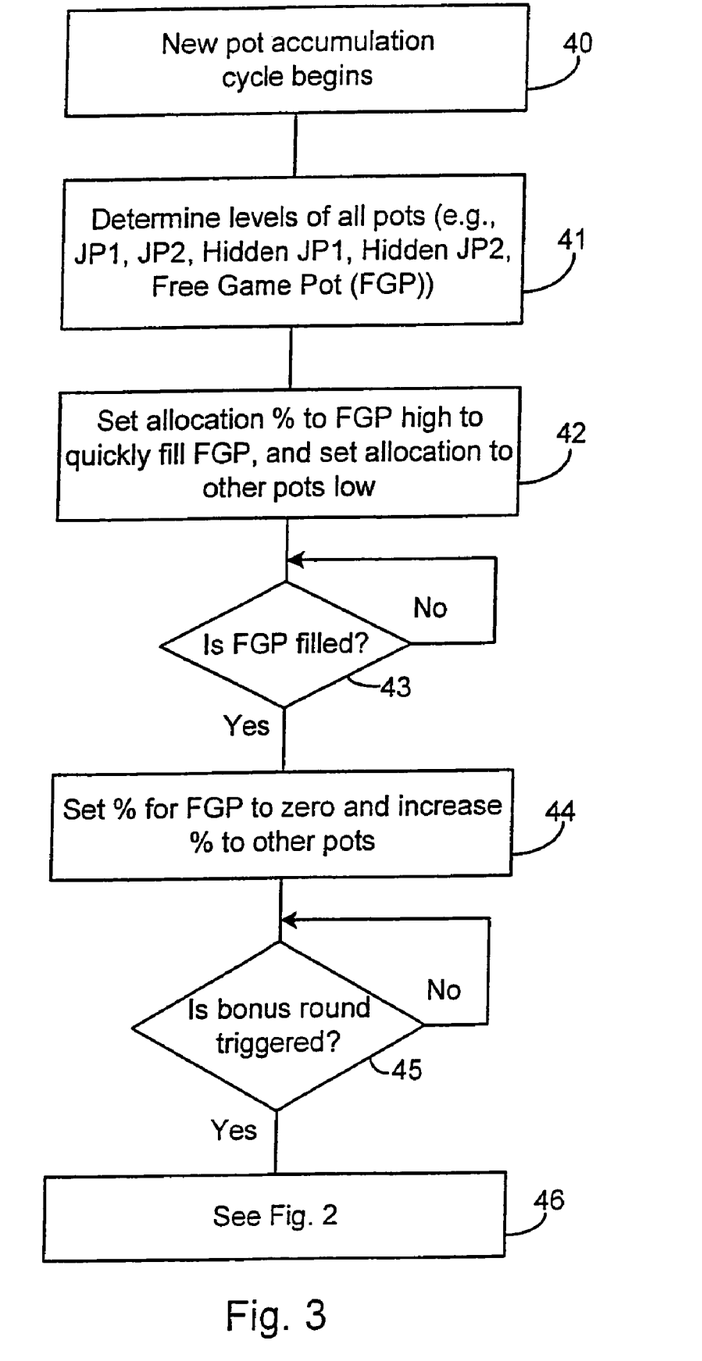
FIG. 3 is a flowchart providing additional detail of dynamically allocating percentages of the wagers to the various pots.

FIG. 3 is a flowchart that describes the dynamic allocation of money to various pots used in one embodiment. In one embodiment, the pots associated with the free game bonus round include jackpot 1 (JP1), jackpot 2 (JP2), hidden JP1, hidden JP2, and free game pot (FGP). JP1 is a relatively small jackpot (e.g., 50-100 dollars) that is eligible for winning frequently, such as multiple times per day. JP2 is a larger jackpot (e.g., 1,000-2,000 dollars) that is eligible for winning much less frequently than JP1.

Hidden JP1 is a pot that is used to refill JP1 to a starting level after JP1 has been won by a player. Providing a non-zero starting value of JP1 is preferable to JP1 starting at a zero value so players have more incentive to play the machines. Hidden JP2, used to refill JP2 after JP2 has been won, is typically larger than hidden JP1.

The free game pot is a pot that is calculated to finance the virtual wagers to play the free games during the free game bonus round so that all the virtual wagers for the free games are paid from the free game pot. By filling the free game pot before a bonus round can be triggered, the free game bonus round feature adds no additional expense to the casino since the free games are funded by the linked machines.

In one embodiment, the free game pot is calculated by multiplying the number of linked gaming machines by the number of free games offered in a bonus round (e.g., ten) and by the maximum bet. The free game pot is based on the worst-case scenario, where it is assumed that all gaming machines are eligible and all players are playing the free game bonus round using a maximum bet. Since an average payout percentage is typically from 88%-98%, the free game pot will, in the long term, find the free game bonus round.

The adequacy of the free game pot for a free game bonus round may also be dynamically determined based upon the current bet for each of the eligible machines rather than based upon the worst-case scenario of the maximum bet multiplied by the number of machines, since the current bet for each eligible machine will be used for each of the games in the free game bonus round. Accordingly, the adequacy of the free game pot can be determined instantaneously from game to game played on the gaming machines and, if adequate, a free game bonus round may be initiated if a triggering event occurs.

The virtual wagers during the free game bonus round are taken out of the free game pot. Any remaining money stays in the free game pot and is used to reach the necessary amount for the next free game bonus round.

There may be various algorithms used for filling the free game pot other than described above. For example, if the eligible machines play different games, the virtual wagers for the free games may be affected. One machine may be a 5-reel, 5-pay line, 1 credit per line machine (a 5-5-1 machine) and others may be 5-9-5 machines, with different virtual wagers per game. The amount to fill the free game pot may take into account the actual games being played during the bonus round. As another example, the eligible machines may have a variety of denominations (value of a single credit). This will also affect the adequacy of the free game pot and may be taken into account when determining if the free game pot is adequate to initiate the bonus round.

A hidden pot may be used to fully or partially refill the free game pot after the end of a bonus round.

The flowchart of FIG. 3 will be used to explain how the percentages of the wagers allocated to the different pots may be dynamically changed based upon the levels of the pots.

In step 40, it is assumed that the previous free game bonus round has ended and all awards are paid. For example, assume JP1 has been paid and hidden JP1 is transferred to the JP1 pot to provide a starting value for JP1. Since the previous bonus round jackpot is assumed to have been for JP1, JP2 and hidden JP2 have not changed during the bonus round. The free game pot from which all wagers during the free game bonus round are taken is now reduced to a low value. In step 40, a new pot accumulation cycle now begins.

In step 41, the master controller, such as controller 4 in FIG. 1 or one of the gaming machines acting as a master, determines the current levels of all the pots JP1, JP2, hidden JP3, hidden JP2, and free game pot. Each pot, including the free game pot, may have a base (minimum) value.

Certain percentages of the wagers are allocated to the various pots JP1, JP2, hidden JP1, hidden JP2, and free game pot, while keeping the total percentage fixed. The total percentage may be any amount determined by the casino. The most important pot to fill first is the free game pot since all the wagers during the free game bonus round should be fully supplied by the free game pot.

In step 42, since the free game pot must be filled before any free game bonus round can be triggered, the allocation percentage to the free game pot is set high to quickly fill the free game pot. Since the total percentage of the wagers allocated to the pots is a fixed percentage, setting the free game pot allocation high requires the percentage for the remaining pots to be set lower. In one embodiment, the percentage of the wagers allocated to other than the free game pot is set to zero so the maximum allocation percentage is applied to the free game pot until the free game pot is filled. In some jurisdictions, a zero level is impermissible, and a non-zero percentage must be used.

The controller determines all the amounts wagered in the linked gaming machines and fills the pots in accordance with their respective dynamically allocated percentages.

In step 43, it is determined whether the free game pot is filled. If not, the percentage allocations remain unchanged.

In step 44, if the free game pot is filled, then the percentages of the wagers allocated to the other pots are increased, as appropriate, and the percentage of the wagers allocated to the free game pot is reduced to zero (or other low amount). If the free game pot is filled, the free game bonus round may be triggered by a triggering event.

In step 45, it is determined whether the bonus round has been triggered based on a certain event. In one embodiment, the bonus round is triggered upon either of the jackpots JP1 or JP2 reaching a certain level. This level, within a certain range, may be determined randomly by a random number generator. A much lower level for JP1 is required to trigger the bonus round for winning JP1, so JP1 will be eligible for winning much more frequently than JP2 will be eligible for winning. If the bonus round is triggered, the process will then proceed as described with respect to FIG. 2.

Various features may be added to add excitement to the free game bonus round such as by providing a celebration type of display on the main display of each gaming machine. Further, the jackpots (or a third jackpot) to be won may remain a mystery rather than being displayed to the players. The frequency of the low jackpot JP1 and the frequency of high jackpot JP2 being available for winning may be adjusted to be optimum by selecting the triggering level for each jackpot and selecting the percentage of the wagers allocated to each of the jackpots.

The number of free games in the bonus round may be fixed for all players or may be different depending upon the player's previous bet prior to the free game bonus round being initiated as an incentive for the player to play a maximum bet.

Further, the number of free games played in the bonus round may be the same for each player but the number of free games during a bonus round may change depending on any number of factors such as randomly or based upon the jackpot level.

The percentage allocated to each of the jackpots (including the hidden jackpots) may be dynamically adjusted to optimize the performance of the system or to add variety to the bonus round feature. For example, the dynamic allocation may also be applied to the hidden jackpots for JP1 and JP2 to vary the starting values of JP1 or JP2 after the jackpot is won. This can be used to adjust the time it takes for JP1 or JP2 to reach the trigger level for the bonus round. In another example, when an upper limit to the one of the jackpots JP1 or JP2 is close to being reached, the percentage allocation for that jackpot is reduced, and the percentage of the wagers to the associated hidden jackpot is increased. Also, if the time from the last bonus round is unduly long, the percentage allocation to one of the jackpots may be increased in order to quickly trigger a bonus round.

Figure 4:
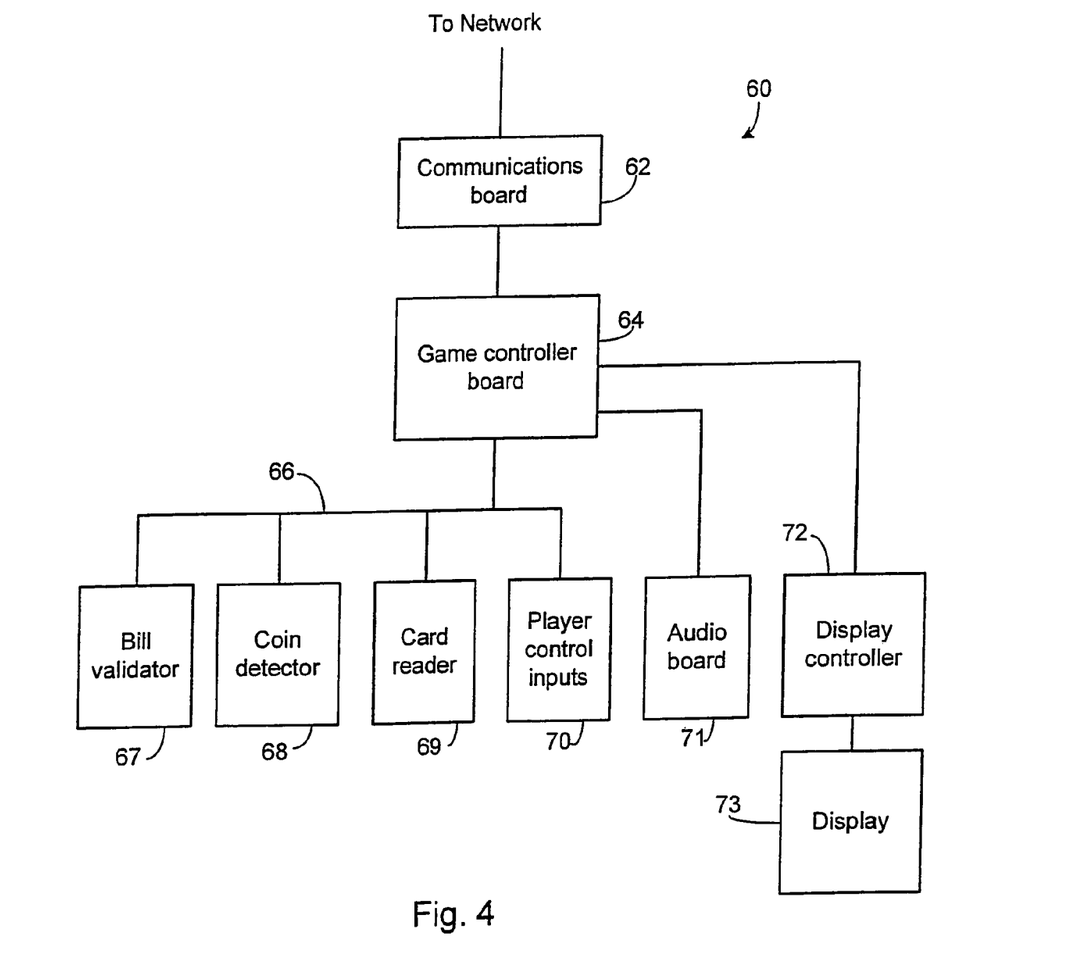
FIG. 4 is a simplified block diagram of an electronic gaming machine that may be operated in accordance with the present invention.

FIG. 4 is a block diagram of one type of gaming machine 60 that may be linked to other gaming machines and may include software to carry out the free game bonus round. The gaming machine 60 may use conventional hardware. Existing electronic gaming machines are already equipped with hardware/software that detects special codes to play free games, such as for testing or demonstrating the machine, so implementation of the present invention (running a software program on a controller) is relatively simple.

A communications board 62 may contain conventional circuitry for coupling the gaming machine 60 to a local area network (LAN) or other type of network using Ethernet or any other protocol. The communications board 62 transmits using a wireless transmitter, or it may be directly connected to a network running throughout the casino floor. The communications board 62 basically sets up a communication link with a master controller and buffers data between the network and the game controller board 64. The communications board 62 may also communicate with a network server for purposes other than the free game bonus feature.

The game controller board 64 contains memory and a processor for carrying out programs stored in the memory and for providing the information requested by the network. The game controller board 64 primarily carries out the game routines.

Peripheral devices/boards communicate with the game controller board 64 via a bus 66 using, for example, an RS-232 interface. Such peripherals may include a bill validator 67, a coin detector 68, a smart card reader or other type of credit card reader 69, and player control inputs 70 (such as buttons or a touch screen). An audio board 71 converts coded signals into analog signals for driving speakers. A display controller 72, which typically requires a high data transfer rate, converts coded signals to pixel signals for the display 73. Display controller 72 and audio board 71 may be directly connected to parallel ports on the game controller board 64.

The electronics on the various boards may be combined onto a single board.

In an embodiment where a gaming machine acts as the master controller for the bonus round, the gaming machines automatically select one gaming machine to be the master. The other machines become the slaves. The master will then have the additional responsibility of controlling the free game bonus round.

Instead of the free game bonus round being played on linked machines, the free game bonus round may be played on a non-linked machine, where no other machines are competing in the bonus round.

In one embodiment, the players do not compete in the bonus round. Winnings in the bonus round may be limited to the winnings from the individual free games and would not necessarily include a jackpot win at the end of the round.

In one embodiment, instead of, or in addition to, a single main jackpot being won, each player may be awarded a bonus amount for credits or points won during the bonus round exceeding a specified level. For example, if the credits won during the round are less than 500 credits, the player wins no bonus award; if the credits won during the round are 500-1000 credits, the player wins a jackpot 4 bonus; if the credits won during the round are 1001-2000 credits, the player wins a jackpot 3 bonus; if the credits won during the round are 2001-5000 credits, the player wins a jackpot 2 bonus; and if the credits won during the round are greater than 5000 credits, the player wins a jackpot 1 bonus (the largest jackpot). The bonuses may be fixed amounts or progressive amounts. This concept can also be applied to a competition, where the player with the most accumulated bonuses at the end of the free game bonus round receives a special jackpot.

In an alternative embodiment, the level of the jackpot won by a player with the most credits in the free game bonus round depends on the number of credits won during the free game bonus round.

Additionally, the awards won in the free game bonus round need not be based on the total credits won during the free game bonus round. An award to a player can be granted based on the outcome of one or more particular games, such as the first free game or the last free game in the bonus round. The one or more particular games may be predetermined, selected randomly, or selected by the player. An award may be granted for a free game with a certain outcome, such as an outcome displaying a wild card, a high value symbol, a scatter symbol, or a special combination of symbols. The player may even decide which symbol, symbol combination, or other event grants an award. If an award is based on displaying one or more symbols across an activated payline, the players have incentive to bet a maximum number of credits during the paid games if the number of activated paylines during the free games is based on the number of credits bet during the last paid game. The awards granted may be the jackpot, a portion of the jackpot, a fixed award, a progressive award, a mystery award, or any other type of award.

The various bonus awards described above may not require that the player be playing in a free game bonus round.

The jackpot controller 4 may control a gaming machine to create a near-miss outcome, where the symbol combination is nearly a jackpot combination but results in no award to the player. By creating near misses with no payouts, the free game bonus round can be triggered more frequently, and the level of excitement is increased.

A gaming machine, standing alone or in a system of gaming machines, may award a jackpot during normal play by displaying a special jackpot symbol combination as a result of a random selection of symbols by the gamine machine or as a result of a jackpot controller determining the jackpot win by the gaming machine. Another jackpot may be awarded during the free game round, as described above. Any outcome of the gaming machine may be designated a jackpot win. There may be different levels of jackpot wins depending on the symbol combination displayed. For example, a 5-symbol combination may win the top jackpot; a 4-symbol combination may win the second highest jackpot, etc.

Figure 5:
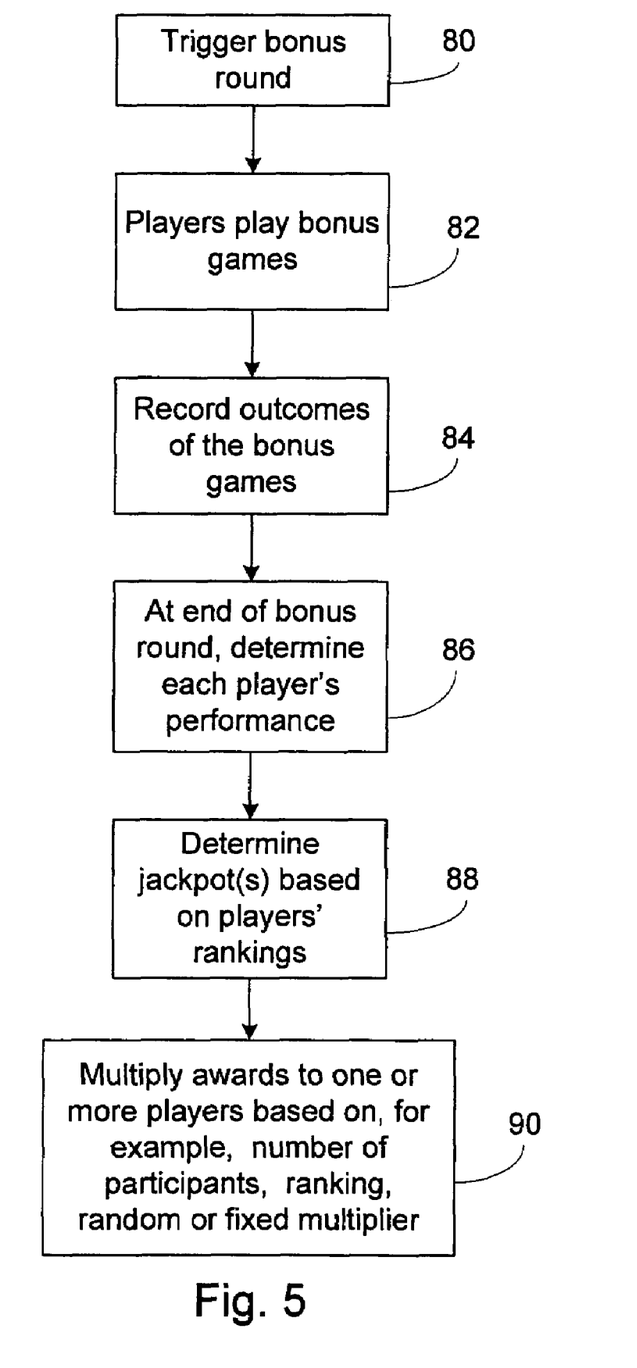
FIG. 5 is a flowchart of certain steps in a bonus round involving multiple machines and multiple players, where awards to the players at the end of the bonus round are multiplied based on certain variables that occur.

In another embodiment, shown in the flowchart of FIG. 5, the awards granted to one or more players in the bonus round are multiplied based on certain variables. The bonus round may be a free game bonus round or any other type of bonus round (e.g., two games for one, etc.)

In step 80 of FIG. 5, the bonus round is triggered in any of the ways described previously.

In step 82, multiple players play the bonus games on their linked gaming machines. The bonus games may be any type of game, such as obtaining randomly selected symbol combinations across paylines.

In step 84, the outcomes of the games for each player are recorded in a memory. The bonus games may grant instant awards to the player as the bonus round is progressing, or the bonus award paid to each player may by solely determined by each player's ranking after the bonus round.

In step 86, after the bonus round is over, the awards accumulated by each player in the bonus round are determined.

In step 88, any jackpot or multiple jackpots are awarded based on the players' rankings, where the ranking is based on the awards accumulated during the bonus round.

In step 90, the base awards to one or more players are multiplied. The multiplier may be based on the number of players in the bonus round, based on the order of ranking, a random multiplier, a fixed multiplier, or based on any other factor. For example, if there are ten players, and a player wins the bonus round, the base jackpot for achieving the number one ranking is multiplied by ten. The player may win the bonus round by, for example, winning the most credits during the round, obtaining the most winning outcomes, obtaining the most special symbols, or meeting any other criteria. The award multiplier(s) may apply to only one player or may apply to multiple players and depend on each player's ranking where, for example, the first place player's base award is multiplied by 5×, the second place player's base award is multiplied by 4×, the third place player's base award is multiplied by 3×, etc.

Alternatively, the winner of the bonus round may receive an award that is multiplied by a fixed or randomly selected multiplier.

The bonus round may be competitive (players' rankings determine the award paid) or non-competitive (players' awards are independent of their rankings).

Any of the games described herein may also be played on computing devices other than dedicated gaming machines in casinos. For example, remotely located computing devices may be linked over the Internet. The computing devices for playing the games described herein may also be mobile telephones with displays, personal digital assistants, pagers with displays, or other devices.

Having described the invention in detail, those skilled in the art will appreciate that given the present disclosure, modifications may be made to the invention without departing from the spirit and inventive concepts described herein. Therefore, it is not intended that the scope of the invention be limited to the specific embodiments illustrated and described.

What is claimed is:

1. A method comprising:
    receiving wagers from players playing paid games on a plurality of eligible gaming devices;
    detecting a bonus round initiation signal for all the eligible gaming devices;
    enabling the players to simultaneously play a plurality of free bonus games on the plurality of eligible gaming devices as a result of the bonus round initiation signal;
    determining a base award to at least a winning player of the bonus games based on a certain outcome of the bonus games played;
    multiplying the base award by a multiplier to obtain a multiplied award, wherein the multiplier is based on a number of players playing the bonus games; and
    granting the multiplied award to at least the winning player of the bonus games.

2. The method of claim 1 wherein the multiplier is a fraction of the number of players playing the bonus games.

3. The method of claim 1 wherein the multiplier equals the number of players.

4. A method comprising:
    receiving wagers from players playing paid games on a plurality of eligible gaming devices;
    detecting a bonus round initiation signal for all the eligible gaming devices;
    enabling the players to simultaneously play a plurality of bonus games on the plurality of eligible gaming devices as a result of the bonus round initiation signal;
    determining a base award to at least one or more players of the bonus games based on a certain outcome of the bonus games played, the players being ranked at an end of the bonus round relative to one another;
    multiplying the base award by a multiplier to obtain a multiplied award; and
    granting the multiplied award to a plurality of players of the bonus games,
    wherein the multiplier is based on a player's ranking achieved in the bonus round.

5. The method of claim 4 wherein determining a base award is also based on a player's ranking at the end of the bonus round.

6. The method of claim 5 wherein the player's ranking is based on total awards accumulated by the player during the bonus round.

7. The method of claim 1 wherein determining a base award comprises determining a base award to the player based on displays of symbols across one or more paylines during the bonus games.

8. The method of claim 1 wherein determining a base award comprises granting a jackpot, a portion of a jackpot, a fixed award, a progressive award, or a mystery award to the player.

* * * * *